P. R. SCHAFER.
GUARD FOR TROLLEY WHEELS.
APPLICATION FILED OCT. 25, 1915.

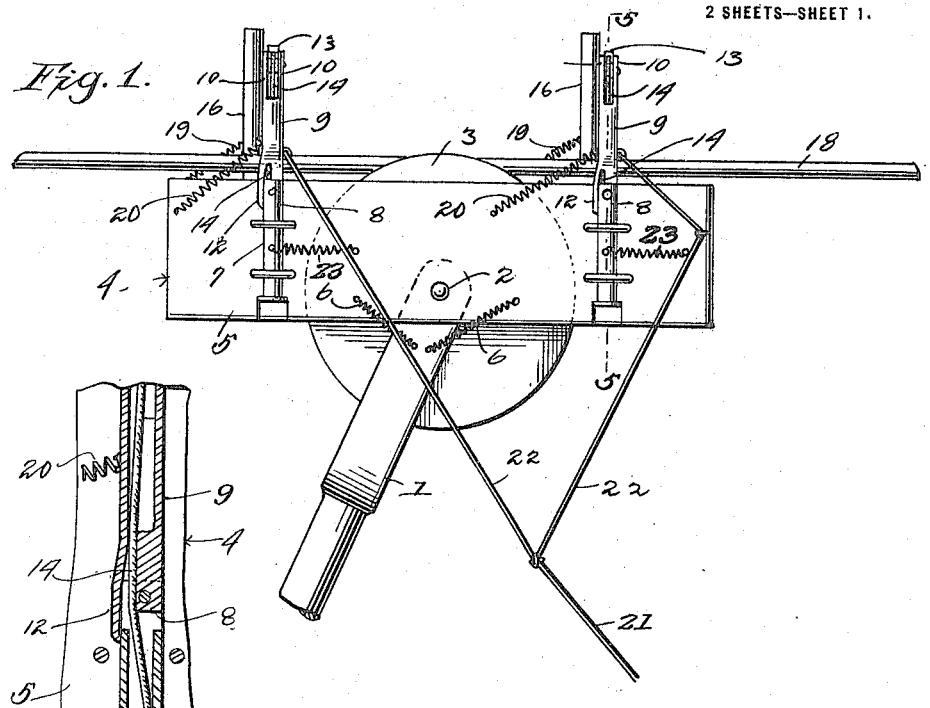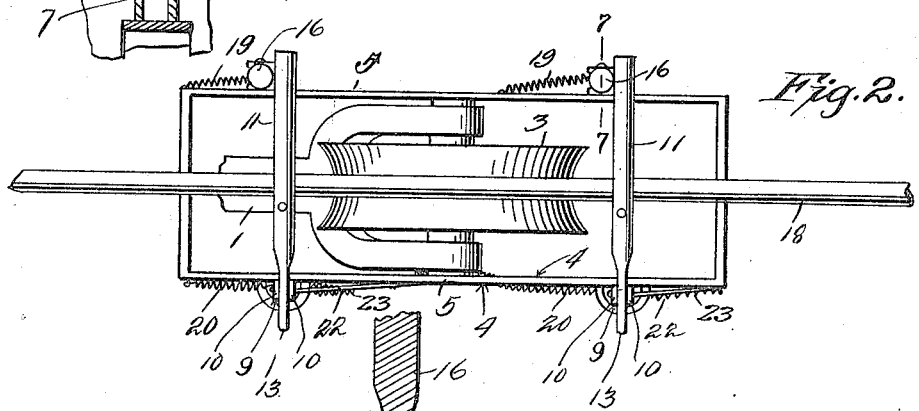

1,194,429.

Patented Aug. 15, 1916.
2 SHEETS—SHEET 2.

Inventor
P. R. Schafer.

UNITED STATES PATENT OFFICE.

PETER RAYMOND SCHAFER, OF BROWNFIELD, PENNSYLVANIA.

GUARD FOR TROLLEY-WHEELS.

1,194,429.   Specification of Letters Patent.   Patented Aug. 15, 1916.

Application filed October 25, 1915.   Serial No. 57,797.

*To all whom it may concern:*

Be it known that I, PETER RAYMOND SCHAFER, a citizen of the United States, residing at Brownfield, in the county of Fayette, State of Pennsylvania, have invented certain new and useful Improvements in Guards for Trolley-Wheels; and I do hereby declare the following to be a full, clear, and exact description of the invention, such as will enable others skilled in the art to which it appertains to make and use the same.

The present invention is directed to improvements in guards for trolley wheels, and has for its object to so construct a device of this character that the trolley wheel will be prevented from leaving the trolley wire during movement of the car.

A further object of the invention is to provide a guard of this nature so constructed that the same can be manipulated so as to permit the trolley wheel to be disengaged from the trolley wire when changing from one trolley wire to the other.

Figure 3:
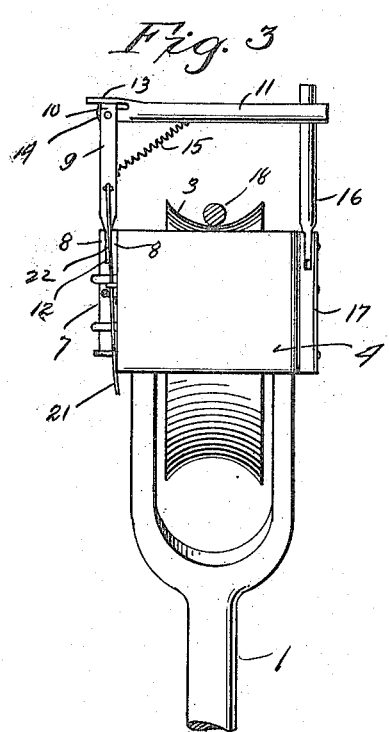
Figure 5:
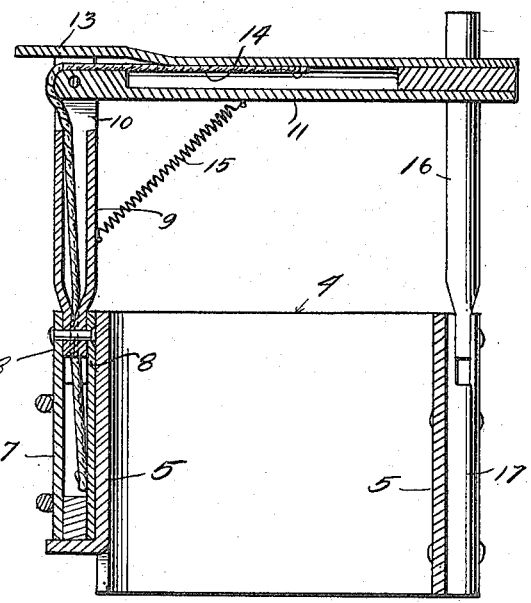
Figure 4:
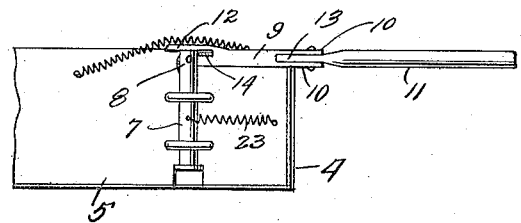
Figure 6:
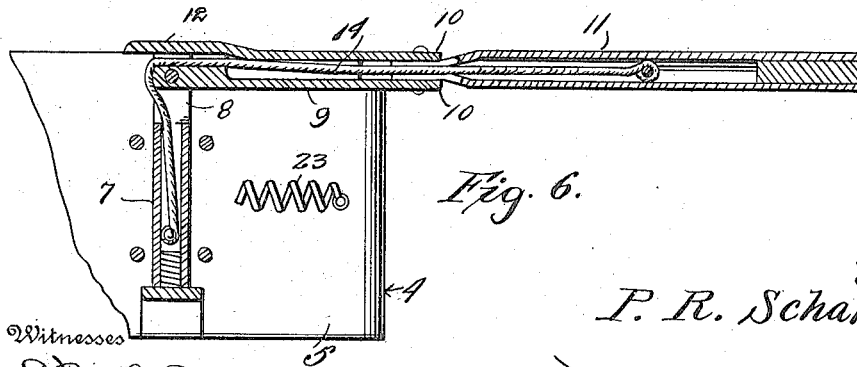

With these and other objects in view, this invention resides in the novel features of construction, formation, combination and arrangement of parts to be hereinafter more fully described, claimed and illustrated in the accompanying drawing, in which:

Figure 1 is a side elevation of the device, showing it in place upon the usual trolley harp; Fig. 2 is a top plan view; Fig. 3 is an end view, showing the guard in its operative position; Fig. 4 is a view, showing the device in its inoperative position; Fig. 5 is a sectional view on the line 5—5 of Fig. 1; Fig. 6 is a vertical sectional view through the guard arms, when in their inoperative position; Fig. 7 is a sectional view on the line 7—7 of Fig. 2; and Fig. 8 is a detail sectional view of the guard member with the parts in operative position.

Referring to the drawing, 1 indicates the trolley harp, which rotatably supports, on the axle 2, the usual trolley wheel 3. The guard consists of a sheet metal frame 4, the same being rectangular in shape and has its sides 5 pivotally connected to the axle 2, said frame being maintained in a horizontal position by the springs 6, which have one of their ends connected to the harp 1, and their other ends connected to the sides of the frame 4.

Rotatably engaged upon one of the sides 5 are tubular rods 7, which have their upper ends provided with spaced ears 8 between which are pivotally connected the lower ends of the tubular arms 9, said arms being also provided at their upper ends with spaced ears 10. Pivotally connected between the ears 10 are tubular arms 11. The arms 9 and 11 are provided with stops 12 and 13, which are adapted to engage the arms 9 and 11, respectively, to limit the swinging movement of said arms in one direction. Cords 14 are provided and have their upper ends fixed in the arms 11, said cords being passed through the arms 9 and have their lower ends fixed to the rod 7, the purpose of which will later appear.

The arms 11 are connected to the arms 9 by coil springs 15, which are adapted to normally hold the arms 11 in a horizontal position, so that their free ends will rest against the arms 16, which are pivotally supported by the rods 17, said rods being suitably secured to the other side of the frame 4. Thus it will be seen that the arms 11 extend across the frame 4, and above the trolley wire 18, thereby preventing the same from leaving the wheel 3 when the car is in motion. The arms 16 are connected to the adjacent side of the frame by coil springs 19, while the arms 9 are connected to the adjacent sides of the frame and by coil springs 20, said springs serving to return the arms 9 and 16 to their vertical positions after contacting with the cross wires which support the trolley wire 18.

The cords 14 are of such length that when the arms 9 are swung downwardly, then the cords 14 will pull on the arms 11, and thereby swing the arms 11 to a vertical position so that the guard can be lowered from the trolley wire 18. To remove the guard from engagement with the wire a cord 21 is provided, and has its upper end terminating in branches 22, said branches having their upper ends connected to the arms 9. When the cord 21 is pulled it is obvious that the arms 9 will simultaneously swing downwardly and the arms 11 upwardly. As soon as pressure is relieved on the cord 21 it is obvious that the springs 20 and 15 will act to return the arms 9 and 11 to their normal or operative position, it being of course understood that this is not done until the trolley wire has been placed in the groove of the trolley wheel.

The rods 7 are connected with the adjacent sides of the casing by coil springs 23, which serve to return the rods to their normal positions after the same have been partially rotated upon swinging of the arms 9 and 11.

What is claimed is:—

1. In a device of the class described, the combination with a harp, of a frame pivotally connected to the harp, posts pivotally connected to one side of the frame, tubular rods rotatably supported by the other side of the frame, upper and lower tubular arms having their adjacent ends pivotally connected, the lower arms being pivotally connected to the rods, cords having their upper ends fixed to the upper arms and their lower ends fixed to the rods, the upper arms being normally horizontal and engaged with said posts, and means for simultaneously swinging the upper and lower arms downwardly, whereby said cords compel the arms to aline, as and for the purpose set forth.

2. In a device of the class described, the combination with a harp, of a frame pivotally supported thereby, rods supported by one side of the frame, posts carried by the other side thereof, upper and lower pivotally connected arms, the lower arms being pivotally connected to the rods, said upper arms being normally horizontal and engaged with the posts, and means for simultaneously swinging the arms downwardly into horizontal alinement, as and for the purpose set forth.

In testimony whereof, I affix my signature, in the presence of two witnesses.

PETER RAYMOND SCHAFER.

Witnesses:
PETER SCHAFER,
MIKE SCHAFER, Jr.

Copies of this patent may be obtained for five cents each, by addressing the "Commissioner of Patents, Washington, D. C."